UNITED STATES PATENT OFFICE.

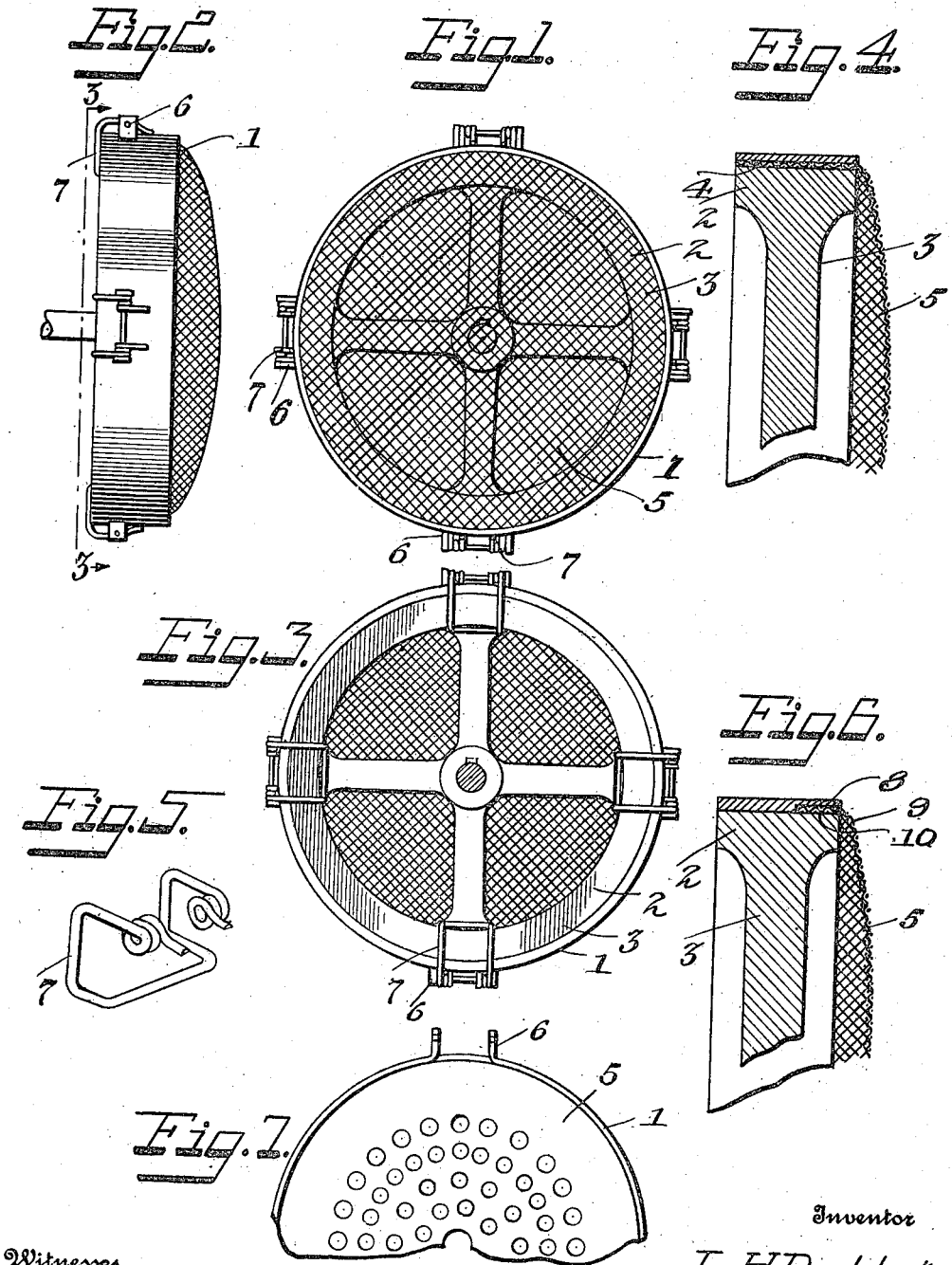

LILLIE H. PADDOCK, OF SUPERIOR, WISCONSIN.

WHEEL-GUARD.

1,279,417.

Specification of Letters Patent.  Patented Sept. 17, 1918.

Application filed March 1, 1918. Serial No. 219,825.

*To all whom it may concern:*

Be it known that I, LILLIE H. PADDOCK, a citizen of the United States, residing at Superior, in the county of Douglas and State of Wisconsin, have invented new and useful Improvements in Wheel-Guards, of which the following is a specification.

This invention relates to guards for wheels and more particularly to the means for attaching the guard to the periphery of the wheel.

The primary object of the invention is to construct a guard completely inclosing an end of the wheel and having detachable connection with the rim thereof.

Another object of the invention is to provide a guard including a metallic band adapated to be arranged concentrically of the rim of a wheel and to have secured thereto clamps which are adapted to engage a side and under surface of the rim of the wheel.

A further object of the invention is the novel manner in which the edge of the wire mesh forming one element of the guard is held from movement during the centrifugal action of the wheel.

The invention consists in the features of construction, combination and arrangement of parts, hereinafter fully described and claimed, reference being had to the accompanying drawings, in which:—

Figure 1 is a side elevation of my guard showing it applied to a wheel.

Fig. 2 is an end elevation thereof.

Fig. 3 is a section on line 3—3 of Fig. 1 looking in the direction of the wheel.

Fig. 4 is a vertical longitudinal section through the device.

Fig. 5 is a detail view of one of the clamps.

Fig. 6 is a modified form of my invention.

Fig. 7 is a modified view showing the guard stamped from a single sheet of metal.

In the drawing, the numeral 1 designates a metallic band adapted to encircle the rim 2 of a wheel 3 when in applied position. The inner peripheral surface of the band 1 has secured thereto in any suitable manner the edge portion 4 of a cover 5, the latter being made of wire mesh or other foraminous material with the view of decreasing the weight of the guard as a whole and to allow the proper ventilation.

Hinged to the outer peripheral surface of the band as indicated at 6 are U-shaped clamps 7 arranged to engage one side of and the under surface of the rim of the wheel.

From this arrangement it will be seen tha the guard will be effectively held upon the rim of the wheel and the edge portion of the covering tightly held between the rim of a wheel and the inner surface of the band.

In Fig. 6 I have shown a slight modification in which the inner peripheral surface of the band is recessed as shown at 8 so as to receive the edge portions of the cover. The cover 5 is shown bowed in an outward direction so that the same will resiliently accommodate any inward pressure that may be caused by the guard coming into contact with foreign bodies. To reduce the cost of the guard as a whole, the same can be readily stamped from sheet metal as shown in Fig. 7.

In this particular instance the bulged portion 9 of the guard contacting with one side of the rim of the wheel limits the movement of the annular portion 10 over the outer peripheral surface of the rim so that the clamp 11 may properly engage with the wheel.

What I claim is:

1. In combination with the rim of a wheel, a guard encircling the rim of the wheel and inclosing the side thereof, and fastening means pivotally secured to the guard and engaging the rim of the wheel.

2. In combination with a wheel, a band encircling the rim thereof, a wire cover inclosing one side of the wheel and having a portion arranged between the band and the wheel rim, and means for clamping the band to the wheel rim.

3. In combination with a wheel, a band encircling the wheel rim, a cup-shaped foraminous cover having its edge portion secured to the inner peripheral surface of said band, a substantially U-shaped clamp hinged to the outer peripheral surface of the band and adapted to engage one side and the under-surface of the wheel rim.

In testimony whereof I affix my signature in presence of two witnesses.

LILLIE H. PADDOCK.

Witnesses:
 IRENE O'BRIEN,
 R. M. RIESER.

Copies of this patent may be obtained for five cents each, by addressing the "Commissioner of Patents, Washington, D. C."